United States Patent [19]
Chiba

[11] 3,849,769
[45] Nov. 19, 1974

[54] INDICATING APPARATUS

[76] Inventor: Yoshio Chiba, 168-30 Ninchi, Yawata-cho, Toyokawa, Japan

[22] Filed: Sept. 11, 1973

[21] Appl. No.: 396,318

Related U.S. Application Data
[63] Continuation of Ser. No. 250,364, May 4, 1972, abandoned.

[30] Foreign Application Priority Data
May 4, 1971  Japan.................. 46-29652

[52] U.S. Cl............ 340/213 R, 340/248 D, 354/60, 356/226
[51] Int. Cl.......................... G08b 21/00, G01j 1/44
[58] Field of Search............... 340/213, 221, 248 D; 331/55, 56, 64, 66; 95/10 B; 356/226; 354/60

[56] References Cited
UNITED STATES PATENTS

| | | | |
|---|---|---|---|
| 3,414,739 | 12/1968 | Paidosh............................ | 331/66 X |
| 3,426,662 | 2/1969 | Sevin................................ | 95/10 CD |
| 3,516,750 | 6/1970 | Schmitt............................ | 356/226 X |
| 3,581,643 | 6/1971 | Yoshimura....................... | 356/226 X |
| 3,594,088 | 7/1971 | Akiyama et al.................. | 356/226 |
| 3,668,985 | 6/1972 | Wazumi............................ | 95/10 C |

Primary Examiner—Donald J. Yusko
Attorney, Agent, or Firm—Craig & Antonelli

[57] ABSTRACT

An indicating apparatus provides an indication of three ranges, for instance, over-exposure, appropriate exposure and insufficient exposure, for a photographic camera, by continuously energizing a first lamp, by continuously energizing a second lamp and by alternately energizing the first and second lamps with a preset frequency, respectively. The frequency can be maintained at a constant value, irrespective of the selection of the exposure value.

8 Claims, 5 Drawing Figures

INDICATING APPARATUS

This is a continuation of application Ser. No. 250,364 filed May 4, 1972, now abandoned.

BACKGROUND OF THE INVENTION

This invention relates to an indicating apparatus for indicating whether a measured value is within or outside a predetermined range. More particularly, this invention is concerned with an indicating apparatus, wherein an indication is made by energizing lamps or by sounding a buzzer or bell, by controlling a transistor circuit so as to start or stop the oscillation of this circuit.

Hitherto, in cameras or like apparatus, there has been a need for an indicating apparatus capable of indicating a measured value in a digital system or an analog system. However, in such an indicating apparatus, the employment of a digital or analog indicating means results in an undesirable expense for a small personal apparatus such as a photographic camera. Moreover, an analog instrument such as an ammeter is very fragile and may be damaged by shocks or vibrations.

Instead of the above-mentioned digital or analog indicating means for use in a camera, there has been a two-range indicating means which comprises a lamp which is lit only when the measured value is in a predetermined range, or a three-range indicating means which comprises a pair of lamps, one of which is lit when the measured value is outside the higher boundary of a predetermined range, and the other lamp of which is lit when the measured value is outside the lower boundary of the predetermined range, both lamps being lit when the measured value is within the predetermined range.

The above-mentioned indicating means, comprising an indication lamp or lamps, has the shortcoming that when the filaments of the lamp or lamps are off, the indication is not correctly provided, causing an erroneous reading.

In order to avoid such an erroneous reading and also to provide a stronger indication, there has been an improvement wherein the lamps are blinked. In such a conventional three-stage lamp-indicating means, lamps are connected to the collector circuits of the output transistors, of a pair of transistor oscillators, respectively. These oscillator circuits are constituted to oscillate, so that the output transistors alternately stop and allow the currents to flow through the lamps, so as to blink the lamps when the conditions for oscillation are fulfilled, upon reaching a state that the measured value falls within a predetermined range. In such a conventional three-range indication means, there is the shortcoming that the frequency of the oscillations, i.e., the frequency of the blinking of the lamps is influenced by changes in the conductivity of a photoconductive element which is connected to the base of a transistor of the circuit, so as to influence the lighting of the lamps with its conductivity change. Accordingly, the blinking may become too slow or too quick to provide effective reading.

The above-mentioned shortcoming of conventional indicating means is explained hereinafter referring to FIG. 1, which shows the circuit of an exposure-indicator of a three-range blinking type, for use in a photographic camera.

In FIG. 1, a variable resistor 2 is for setting an exposure value of the camera, and a photoconductor element or photoconductive element 1 is for measuring intensity of light from a scene to be photographed. Transistors 3 and 4 together constitute a differential amplifier with their emitters commonly grounded through a common-emitter resistor 9. Transistors 5 and 6 are output transistors, the bases of which are connected to the collectors of the transistors 3 and 4, respectively. Indicating lamps 7 and 8 are connected to the collector circuits of the transistors 5 and 6, respectively. A D. C. power source 13 is connected to feed a D. C. current across the emitters and collectors of the transistors 5 and 6, respectively. Resistors 10 and 11 are connected across the power source 13 so as to form a voltage dividing circuit for feeding a divided voltage to the base of the transistor 4. The resistor 2 and the photoconductor element 1 are connected across the power source 13 so as to form the other dividing circuit for feeding a voltage determined by the setting of the variable resistor 2 and by the light incident on the photoconductor element 1, to the base of the transistor 3. The base of the transistor 3 is connected to the emitter of the transistor 5 through a feedback capacitor 14. If the capacitor 14 is not provided, the circuit does not oscillate, and consequently, the lamps do not blink.

The apparatus operates as follows. If the light incident on the photoconductor element 1 is insufficient for the exposure value which is preset by the variable resistor 2, due to large magnitude of the resistance of the photoconductor element 1, the base voltage of the transistor 3 becomes higher than a predetermined level, hence turning the transistor 3 "on" and the transistor 4 "off". Accordingly, the transistor 5 is "on" and the lamp 7 is energized, while the transistor 6 is "off" and the lamp 7 is turned off.

When the incident light is insufficient and the transistors 3 and 5 are turned on, the base voltage of the transistor 3 becomes very high and the collector current of the transistor 5 nearly reaches saturation, making the voltage of the collector of the transistor 5 almost equal to that of the power source 13.

Accordingly, the base voltage of the transistor 3 is almost fixed at a constant voltage. Accordingly, the capacitor 14 does not function as a feedback loop, and the circuit does not oscillate.

If the light incident of the photoconductor element 1 is too intense for the exposure value which is preset by the variable resistor 2, due to smallness of the resistance of the photoconductor element 1, the base voltage of the transistor 3 becomes lower than the predetermined level, hence turning the transistor 3 "off" and the transistor 4 "on". Accordingly, the transistor 5 "off" and the lamp 7 is turned off, while the transistor 6 is turned "on" and the lamp 8 is lit.

When the incident light is too intense and the transistors 3 and 5 are cut off, the capacitor 14 does not affect the states of the transistors 3, 5, 4 and 6, and accordingly, no blinking of the energized lamp 8 takes place.

If the intensity of the incident light is appropriate for the preset exposure value, which is preset by the variable resistor 2, both the transistors 3 and 4 are turned on.

In this case of appropriate value, the energization of the lamps 7 and 8 is affected by the feedback capacitor 14 as follows.

When the incident light is appropriate, namely, within a preset range, the base voltage of the transistor 3 is lower than for the case of insufficient incident light, although the transistor 3 is still in the "on" state, and the collector voltage of the transistor 5 is lower than the voltage of the power source 13 due to the voltage drop across the lamp 7. Accordingly, the collector voltage of the transistor 5 responds well to changes in the base voltage of the transistor 3, causing changes in its collector current. Due to this response, a slight increase in the collector current of the transistor 5 causes a slight increase in its collector voltage, and this voltage increase is positively fed back to the base of the transistor 3 through the capacitor 14, and, hence, the collector current of the transistor 5 increases rapidly due to the positive feedback, and then saturates. Thereafter, the capacitor 14 is gradually charged, and then the base voltage of the transistor 3 approaches a specified voltage which is determined by the resistances of the photoconductor element 1 and the resistor 2. Due to the charging of the capacitor 14, the base voltage of the transistor 3 decreases and also the collector current of the transistor 5 decreases. Due to this decrease in the collector current of the transistor 5, its collector voltage decreases and this decrease of the collector voltage is transmitted to the base of the transistor 3, causing a decrease in the base voltage of the transistor 3. Accordingly, the collector current of the transistor 5 decreases rapidly resulting in a cut-off state.

Simultaneously, the transistors 4 and 6 are turned "on", lighting the lamp 8. The lighting of the lamp 8 lasts until the capacitor 14 is fully charged, and hence, the base voltage of the transistor 5 reaches the specified level determined by the resistance of the photoconductor and the resistor 2. Thus, repeating the above-mentioned process, the entire circuit operates as a relaxation oscillator and the lamps 7 and 8 are lit alternately. The frequency of the relaxation oscillation, namely the number of alternations per second is determined by the charging rate of the capacitor 14. The energized period of the lamp 7 is mainly determined by the voltage of the power source 13 and the time constant of a circuit which consists of the photoconductor element 1, the capacitor 14 and the emitter-collector circuit of transistor 5. The extinguished or off period (i.e., an interval between the energized on times) is the "off" period of the transistor 5, accordingly, is determined by the voltage of the power source 13 and the time constant of a circuit which consists of the variable resistor 2, lamp 7 and the capacitor 14. For both the lamps 7 and 8 to be simultaneously energized requires that the proportion between the resistances of the photoconductor element 1 and the resistance 2 be within a certain range. Accordingly, the time constants is influenced by adjusting the variable resistor 2, which is varied when setting a desired exposure value. As a result, the frequency and period of energization are influenced by the setting of the exposure value by adjusting the variable resistor 2.

In order to avoid the above-mentioned adverse influences of exposure setting to the frequency and to the period during which the lamp is lit, another circuit as shown in FIG. 2 is devised, wherein, instead of the capacitor 14 of FIG. 1, a feedback capacitor 15 is connected between the base of the transistor 4 and the collector of the transistor 6.

In the circuit of FIG. 2, the proportion of resistances between the resistors 10 and 11 is constant and, hence, the time constants influential to the frequency and lighting time are constant. However, in this circuit, also, it is difficult to fulfill both conditions of simultaneous lighting of the lamps 7 and 8, and of oscillation at a proper frequency and proper lighting period. Also, it is difficult for the circuit of FIG. 2 to oscillate even for an appropriate incident light value, if the value of the incident light is near the boundary adjacent the excessive range and, hence, the transistor 6 is close to saturation. This difficulty also appears in the apparatus of FIG. 1 when the incident light is near the boundary adjacent the insufficient range.

SUMMARY OF THE INVENTION

Accordingly, an object of this invention is to provide an improved indicating apparatus which is capable of indicating a measured condition with three ranges namely, "excessive", "appropriate" and "insufficient", by continuous lighting of one lamp, by continuous lighting of another lamp, and by alternate lighting of both lamps at a substantially constant frequency respectively.

DETAILED DESCRIPTION OF THE INVENTION

Figure 1:
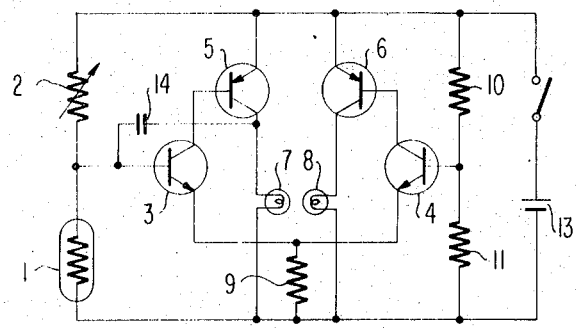
FIG. 1 is a circuit diagram showing an example of a conventional indicating apparatus.
Figure 2:
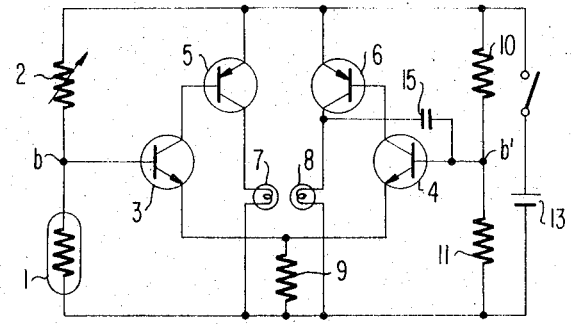
FIG. 2 is a circuit diagram showing a modification of a conventional example of FIG. 1.
Figure 3:
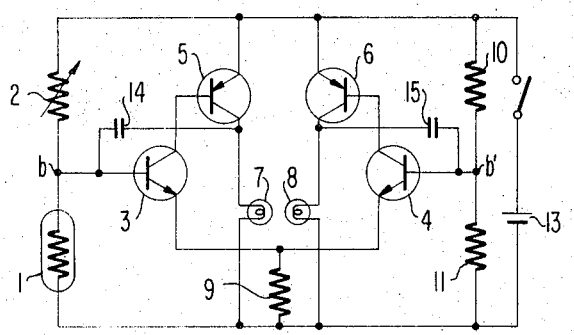
FIG. 3 is a circuit diagram showing an example of the present invention.
Figure 5:
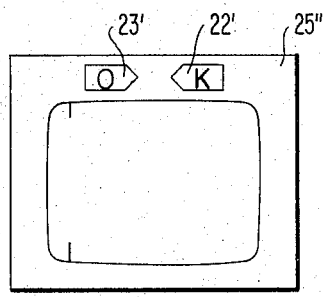
FIG. 5 shows a finder image obtainable with the example shown in FIG. 4.

Further advantages and objects will be explained hereinafter referring to FIG. 3 illustrating a circuit of one example of an exposure indicating apparatus of a photographic camera, embodying the present invention wherein variable resistor 2 is for setting an exposure value of the camera, and a photoconductor element 1 is for measured intensity of the light from a scenery to be photographed. Transistors 3 and 4 together constitute a differential amplifier with their emitters commonly grounded through a common-emitter resistor 9 so that the on-off states of the corresponding transistor 3 and 4 are opposite each other. Transistors 5 and 6 are output transistors, the bases of which are connected to collectors of the transistors 3 and 4, respectively. Indicating lamps 7 and 8 are connected to the collector circuits of the transistors 5 and 6, respectively. A D. C. power source 13 is connected so as to provide a D. C. bias across the emitters and collectors of the transistors 5 and 6, respectively. Resistors 10 and 11 are connected each other in series across the power source 13 so as to form a dividing circuit for feeding a dividing voltage to the base of the transistor 4. The resistor 2 and the photoconductor element 1 are connected with each other in series across the power source 13 so as to form the other dividing circuit for feeding a voltage, determined by setting of the variable resistor 2 and by the light incident on the photoconductor element 1, to the base of the transistor 3.

A first feedback capacitor 14 is connected between the base of the transistor 3 and the collector of the transistor 5, and a second feedback capacitor 15 is connected between the base of the transistor 4 and the collector of the transistor 6.

Figure 4:
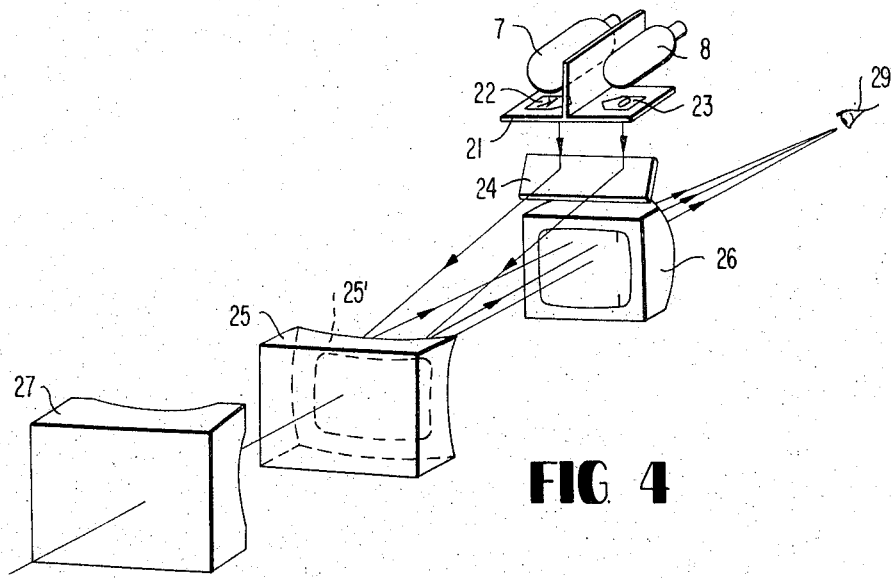
FIG. 4 is a perspective view showing an arrangement of optical parts which are relevant to one example of the present invention.

The mechanical arrangement of the relevant optical parts of the example is shown in FIG. 4, wherein light-passing holes 22 and 23 of the light shielding mask 21 are arranged so as to pass the light from the lamps 7 and 8 therethrough. A mirror 24 is arranged so as to reflect the light from the lamps 7 and 8 and via a reflecting frame 25' provided on the rear face of a second objective lens 25 of the camera. The reflected light passes through the eyepiece lens 26 to the eye 29 of the person, together with light from a photographic object (not shown in the drawing) through a first objective lens 27, the second objective lens 25, and the eye-piece lens 26.

According to the above-mentioned construction, either one of the circuits formed by transistors 3 and 5 or transistors 4 and 6 is capable of oscillating, on condition that the incident light is appropriate and both transistors 3 and 4 are conductive. Therefore, the other circuit not oscillating is forced to oscillate, since the transistors 3 and 5 are connected to form a differential amplifier, by connecting their emitters commonly to a common emitter resistor 9 and, accordingly, the oscillating current influences the other transistor to oscillate synchronously.

The details of the oscillation are as follows, provided that the time constant and, hence, the period of the circuit of the capacitor 14 and the transistor 3 and 5 is longer than that of the circuit of the capacitor 15 and the transistor 4 and 6. The state wherein transistor 5 is on and transistor 6 is off at the beginning of the oscillation is taken as a starting point, in order to explain the process. Then, at first, the voltage at the point $b$ (namely, the base of the transistor 3) is at its maximum and about to decrease and simultaneously, the voltage at the point $b'$ (namely, base of the transistor 4) is at its minimum and about to increase. Due to the above-mentioned difference between the time constants, the voltage at the point $b'$ increases slower than the decrease of the voltage at the point $b$. Therefore, when the voltage at the point $b$ approaches the first specified voltage determined by dividing the source voltage by the resistance of the photoconductor element 1 and the variable resistor 2, the voltage at the point $b'$ is far lower than the voltage which is necessary to turn the transistor 4 "on", and the lamp 7 is still lit while the lamp 8 is still off.

Then, after a further charging of the capacitor 15, the voltage at the point $b'$ approaches the voltage which turns the transistor 4 "on", and the base current of the transistor 4 increases and is amplified by the transistors 4 and 6, so as to increase the collector current of the transistor 6. This increase is positively fed back to the base of the transistor 4, and the collector current of the transistor 6 is rapidly increased so as to light the lamp 8. Simultaneously, an increase in the emitter current of the transistor 4 causes an increase in the emitter voltage of the transistor 3 and, hence, causes the transistor 3 to turn off. Consequently, the transistor 5 is turned off and the lamp 7 is turned off.

Upon the above-mentioned alternation of the lighting of the lamps 7 and 8, the capacitors 14 and 15 start charging. Then, when the charging of the capacitor 14 nears saturation of the charging, the voltage at the point $b'$ still keeps the transistor 4 "on" and the transistor 3 "off". Accordingly, the alternation of the lighting of the lamps 7 and 8 does not yet occur. Then, after further charging the capacitor 15, the decrease of the voltage at the point $b'$ causes the collector voltage of the transistor 6 to decrease, and this decrease of the collector voltage is fed back to the base voltage of the transistor 4. Consequently, the transistor 6 is cut off and the lamp 8 is turned off.

Simultaneously, a decrease in the emitter current of the transistor 4 causes a decrease in the emitter voltage of the transistor 3 and, hence, causes the transistor 3 to turn "on". Consequently, the transistor 5 is turned "on" and the lamp 7 is energized.

The frequency of oscillation, namely, the alternation of the "on" and "off" conditions of the circuit, is determined by the longer one of the time constants of the circuits of transistors 3 and 5 and transistors 4 and 6. The time constant of the circuit made of transistor 4 and 6 and the capacitor 15 is selected to be longer than the time constant of the circuit of the transistor 3 and 5 in which the variable resistor 2 is set at its largest value. Since the time constant of the former circuits (4, 6, 15) is constant, due to the above-mentioned selection, the circuits are able to oscillate at a constant frequency in spite of adjustment of the variable resistor 2.

As is explained above, the apparatus of the present invention is capable of providing a three-range indication utilizing a pair of lamps, wherein the lamps are alternately turned "on" and "off" with a preset constant alternating rate period for indication of the appropriate value.

In the actual example, the capacitance of the capacitor 14 is selected to be smaller than that of the capacitor 15.

The invention being thus described, it will be obvious that the same may be varied in many ways. Such variations are not to be regarded as a departure from the spirit and scope of the invention, and all such modifications are intented to be included with the scope of the following claims.

I claim:

1. An indicating apparatus comprising:
   first and second transistors the emitters of which are commonly connected to a common-emitter resistance;
   a first voltage divider circuit comprising a photoconductive element for receiving light to be measured and a variable resistor for setting an appropriate range of light to be measured, the output of said first voltage divider circuit being connected to the base of said first transistor;
   a second voltage divider circuit comprising a pair of fixed resistors, the output of said second voltage divider circuit being connected to the base of said second transistor;
   a first output transistor, the base of which is connected to the collector of said first transistor;
   a first indicator lamp connected to the collector of said first output transistor;
   a second output transistor, the base of which is connected to the collector of said second transistor;
   a second indicating lamp connected to the collector of said second output transistor;

a first feedback capacitor connected to positively feedback the output of said first output transistor to the base of said first transistor;

a second feedback capacitor connected to positively feed back the output of said second output transistor to the base of said second transistor; and means for connecting a D. C. power supply to said transistors and voltage divider circuits.

2. An indicating apparatus according to claim 1, wherein the time constant defining the oscillation frequency of a first oscillator circuit including said first transistor, said first output transistor and said first voltage divider, when the magnitude of the resistance of said variable resistor is adjusted to its maximum value, is shorter than the time constant defining the oscillation frequency of a second oscillator circuit including said second transistor, said second output transistor and said second voltage divider circuit.

3. An apparatus for indicating the magnitude of an input quantity being measured comprising:

a first oscillator circuit;

means, responsive to the magnitude of said quantity being measured, coupled to said first oscillating circuit for controlling the oscillation thereof, comprising a first voltage divider circuit connected to the input of said first oscillator circuit, said voltage divider circuit including a first element for providing an output representative of the value of the quantity being measured and an adjustable impedance element connected thereto, the adjusted value of which sets an appropriate range of light to be measured;

a second oscillator circuit connected in common to said first oscillator circuit; and first and second indicating means connected to respective outputs of said first and second oscillator circuits, for providing an indication of the on-off periods thereof;

wherein each of said first and second oscillator circuits comprises first and second transistors, the collector of the first of which being connected to the base of the second transistor and the collector of the second transistor being connected to a respective one of said indicating means, and comprises a capacitor connected between the base of the first transistor and collector of the second transistor.

4. An apparatus according to claim 3, wherein the inputs of each of said oscillator circuit is applied to the base of the first transistor and further including a second voltage divider connected to the input of said second oscillator circuit.

5. An apparatus according to claim 4, further including means for connecting a D. C. power supply to said first and second oscillator circuits, to each of said indicating means, and each of said voltage divider circuits.

6. An apparatus according to claim 5, wherein the emitters of the first transistors of said first and second oscillator circuits are connected in common through a common-emitter resistor to said D. C. power supply connecting means.

7. An apparatus according to claim 3, wherein each of said indicating means comprises a lamp and wherein said controlling means comprises a photoconductor element.

8. An apparatus according to claim 6, wherein each of said indicating means comprises a lamp and wherein said first element comprises a photoconductive element.

* * * * *